July 6, 1937.　　　　J. R. McLELLAN　　　　2,086,042
PIPE TIP
Filed Oct. 26, 1935

INVENTOR.
Joseph R. Mc.Lellan
BY U. G. Charles
ATTORNEY.

Patented July 6, 1937

2,086,042

UNITED STATES PATENT OFFICE 2,086,042

PIPE TIP

Joseph R. McLellan, Wichita, Kans.

Application October 26, 1935, Serial No. 46,836

2 Claims. (Cl. 131—12)

My invention relates to improvements in a mouth-piece for the stem of a smoker's pipe.

The object of my invention is to provide a mouth-piece arranged to trap and dispose of moisture and means to prevent the moisture from entering the stem channel, otherwise, the said moisture is free to pass through the channel into the bowl of the pipe.

A further object of my invention is to provide a mouth-piece trap simple to construct, efficient in its performance with respect to moisture proofing the channel and bowl of the pipe, and adapted to be arranged in the tip or mouth-piece of an ordinary pipe stem.

These and other objects will hereinafter be more fully explained, reference being had to the accompanying drawing forming a part of this specification and in which like characters will apply to like parts in the different views.

Referring to the drawing:—

Figure 1:
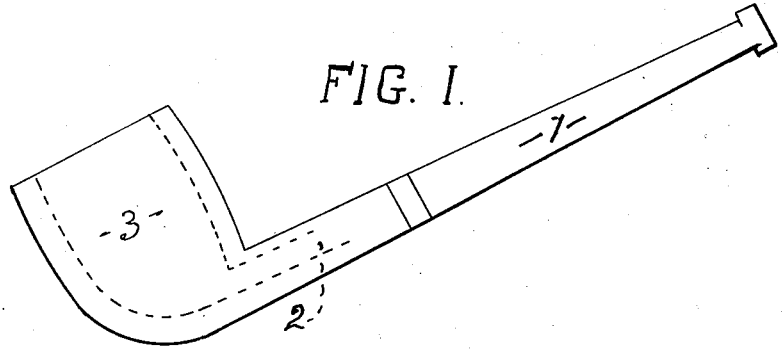
Fig. 1 is a side view of a pipe.
Figure 2:
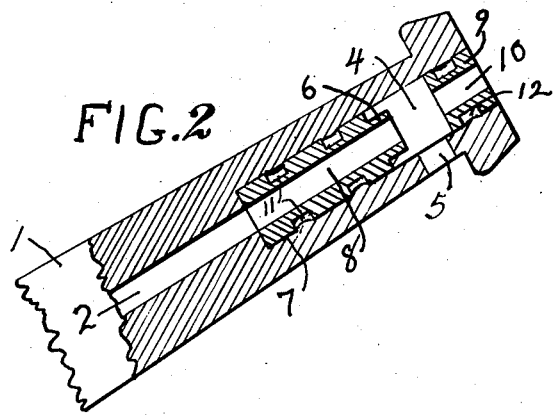
Fig. 2 is an enlarged sectional view through the outer portion of the stem, showing a rimmed tubular section placed axial with the stem channel.
Figure 3:
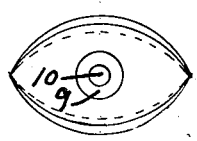
Fig. 3 is an end view of the stem tip.

The principle of my invention relates to a device positioned in the tip end of the mouth-piece of a pipe stem 1, the said stem having a channel 2 axially extending therethrough and communicating with a bowl 3 to which the said stem is joined. Such channel stem and bowl as commonly arranged have no means to prevent moisture from the mouth passing through the channel and into the bowl which renders an unsatisfactory effect to the smoker of the pipe. To avoid such dissatisfaction, I enlarge the channel of the stem by boring in at the tip end of the stem axially with the channel for a short distance as shown in Fig. 2, by which means a trap 4 is formed, and in which the moisture will collect while smoking the pipe, but drained therefrom through an aperture 5 positioned at the underside of the mouth-piece as shown in the drawing, and to guard against moisture entering the end of the channel adjacent the trap, the same is accomplished by an annular flange 6 about the end of tube 7, the said flange extending into the trap, being integrally formed on the end of said tube, as shown in Fig. 2, the hollow 8 of the said tube being axially aligned and in registry with the said channel.

To install the said tube, I bore the stem to a depth so that the flange thereof will be spaced inward from said aperture 5.

To avoid excess discharge of moisture into the bore above referred to, I have inserted in the outer end thereof a plug 9, centrally apertured as at 10, the said aperture axially aligned with the said channel and hollow of the tube and being approximately equal in diameter to said channel, and being so aligned will permit the entry of a swab when cleansing of the channel is required.

Spaced a short distance from each end of the said tube 7 is an annular groove 11 and a similar groove 12 is centrally positioned on the said plug 9, the said grooves function as means to lock the said tube and plug against longitudinal movement when engaged by the stem body shrinking sufficient to imbed in the grooves, it being understood that the mouth-piece and stem or portion thereof adjacent the mouth-piece is of a composition similar to hard rubber and when heated will become pliable, subject to expansion and while in such state of pliability the said tube and plug are inserted and secured by shrinkage of the material imbedding in the grooves.

Such modifications may be employed as lie within the scope of the appended claims.

Having fully described my invention what I claim as new and desire to secure by Letters Patent is:—

1. In a stem for the bowl of a smoker's pipe, the stem being channeled axially communicating with the bowl at its respective end of the stem, the other end functioning as a mouth-piece, and the channel being enlarged a short distance inward at the mouth-piece end of the stem, a tube inserted within the enlarged portion and being in length shorter than the inner extension of the enlarged portion of the channel, another like tube inserted in said enlarged portion of the channel and being positioned so the adjacent ends of said tubular members are spaced apart, there being an aperture in the stem therebetween as a drain for the space, means externally arranged on each tubular member to be engaged by the wall of the enlarged portion of the channel, all substantially as shown.

2. In a mouth-piece portion of the stem of a smoker's pipe, the stem and mouth-piece being channeled axially, the channel passing through the mouth-piece portion of the stem being enlarged a short distance inward from the outer end thereof, a flanged tubular element and a hollow plug inserted within the enlarged portion of the channel, the adjacent ends of said plug and tube being spaced apart to form a trap there-between, and being so positioned, as to align the outer ends of the mouth-piece portion and plug, the trap being drained by an aperture transversely extending through the wall of the mouth-piece portion of the stem adjacent the trap.

JOSEPH R. McLELLAN.